US010672030B2

(12) United States Patent
Chan et al.

(10) Patent No.: US 10,672,030 B2
(45) Date of Patent: *Jun. 2, 2020

(54) TARGETED ADVERTISEMENTS FROM INTENDED RECIPIENT PREDICTIONS DERIVED FROM USER INFORMATION

(71) Applicant: International Business Machines Corporation, Armonk, NY (US)

(72) Inventors: Yuk L. Chan, Rochester, NY (US); Christopher Cramer, Troy, NY (US); Deepti M. Naphade, Fishkill, NY (US); Jairo A. Pava, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 680 days.

This patent is subject to a terminal disclaimer.

(21) Appl. No.: 14/496,286

(22) Filed: Sep. 25, 2014

(65) Prior Publication Data

US 2016/0092921 A1    Mar. 31, 2016

(51) Int. Cl.
*G06Q 30/02* (2012.01)
*G06Q 50/00* (2012.01)

(52) U.S. Cl.
CPC ......... *G06Q 30/0256* (2013.01); *G06Q 50/01* (2013.01)

(58) Field of Classification Search
None
See application file for complete search history.

(56) References Cited

U.S. PATENT DOCUMENTS

| 6,865,546 | B1* | 3/2005 | Song | G06Q 10/1093 |
| | | | | 705/14.35 |
| 7,130,820 | B2 | 10/2006 | Song | |
| 8,117,197 | B1* | 2/2012 | Cramer | G06Q 30/0256 |
| | | | | 707/731 |
| 8,666,836 | B2 | 3/2014 | Adams | |
| 8,700,496 | B2 | 4/2014 | Poisson | |
| 9,171,326 | B2* | 10/2015 | Pavlidis | G06Q 50/01 |
| 2010/0169160 | A1* | 7/2010 | Wu | G06Q 30/02 |
| | | | | 705/14.4 |

(Continued)

OTHER PUBLICATIONS

List of IBM Patents or Patent Applications Treated as Related; (Appendix P), Filed Aug. 23, 2015; 2 pages.

(Continued)

*Primary Examiner* — Michael W Schmucker
*Assistant Examiner* — Bion A Shelden
(74) *Attorney, Agent, or Firm* — Cantor Colburn LLP; Teddi Maranzano

(57) ABSTRACT

A method of generating a targeted advertisement by identifying a target criteria from an entry of a search history associated with a user, identifying an intended recipient based on social information associated with the user and the target criteria, and associating at least one item with the intended recipient by analyzing the social information and the target criteria. Further, the method includes outputting as advertisement information the at least one item and at least one of a plurality of advertisement recipients. The advertisement information enables the generation of the targeted advertisement and the at least one item is utilized in the targeted advertisement.

7 Claims, 14 Drawing Sheets

(56) References Cited

U.S. PATENT DOCUMENTS

| | | | | |
|---|---|---|---|---|
| 2010/0248701 | A1* | 9/2010 | Vance | G06Q 10/10 455/414.2 |
| 2011/0040760 | A1* | 2/2011 | Fleischman | G06F 16/7867 707/737 |
| 2012/0197727 | A1* | 8/2012 | Kim | G06Q 30/02 705/14.64 |
| 2012/0246165 | A1* | 9/2012 | Batraski | G06Q 20/102 707/740 |
| 2013/0041837 | A1* | 2/2013 | Dempski | G06Q 10/101 705/345 |
| 2013/0191521 | A1 | 7/2013 | Kuzmin et al. | |
| 2013/0211942 | A1* | 8/2013 | Linden | G06Q 30/0621 705/26.1 |
| 2013/0211949 | A1* | 8/2013 | Linden | G06Q 30/0621 705/26.5 |
| 2013/0211951 | A1* | 8/2013 | Kalinin | G06Q 30/06 705/26.7 |
| 2013/0246524 | A1 | 9/2013 | Berner et al. | |
| 2013/0268391 | A1 | 10/2013 | Esch et al. | |
| 2013/0303192 | A1* | 11/2013 | Louboutin | G06Q 30/0261 455/456.3 |
| 2013/0304691 | A1 | 11/2013 | Pickney et al. | |
| 2013/0325605 | A1 | 12/2013 | Callaghan et al. | |
| 2014/0081769 | A1 | 3/2014 | Wilen et al. | |
| 2014/0089327 | A1 | 3/2014 | Pavlidis et al. | |
| 2014/0207610 | A1* | 7/2014 | Erez | G06Q 30/0633 705/26.7 |
| 2014/0258021 | A1* | 9/2014 | Akin | G06Q 30/0631 705/26.7 |
| 2014/0280359 | A1* | 9/2014 | Baecklund | G06F 17/30958 707/798 |
| 2015/0205858 | A1* | 7/2015 | Xie | G06Q 50/01 707/755 |
| 2016/0063598 | A1* | 3/2016 | Vad | G06Q 30/0631 705/26.7 |

OTHER PUBLICATIONS

Yuk L. Chan et al., "Targeted Advertisements From Intended Recipient Predictions Derived From User Information Trusted Entitlement Verification", U.S. Appl. No. 14/823,618, filed Aug. 11, 2015.

Anonymous Inventors: "Method and System for Targeted Advertisement Based on Gift Items Purchased Online"; May 13, 2011; Database: ip.com; ip.com No. IPCOM000206948D.

Sudhakar Reddy M; "A Method and System for Displaying Advertisements based on User Related Events"; Aug. 18, 2011; Database: ip.com; ip.com No. IPCOM000209871D.

\* cited by examiner

TARGETED ADVERTISEMENTS FROM INTENDED RECIPIENT PREDICTIONS DERIVED FROM USER INFORMATION

BACKGROUND

The present disclosure relates generally to targeted advertising for purchasable items, and more specifically, to generating targeted advertisements based on intended recipient predictions, the intended recipient predictions being derived from user information.

In general, targeted advertising is when advertisements based on items of previous interest to a user are provided to that user while web browsing. Targeted advertising thus enables advertisers to direct specific advertisements to particular users who are more likely to engage with those specific advertisements. However, targeted advertisements are often wasted on users who are not looking to purchase the advertised product for a variety of reasons.

SUMMARY

Embodiments include a method, system, and computer program product for identifying, by a processor, a target criteria of a search entry from a search history associated with the online activity of a user; identifying, by the processor, an intended recipient based on social information associated with the user and the target criteria; associating, by the processor, at least one item with the intended recipient by analyzing the social information and the target criteria.

Additional features and advantages are realized through the techniques of the present invention. Other embodiments and aspects of the disclosure are described in detail herein. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, targeted advertisements can be wasted on users who are not looking to purchase the advertised product. Embodiments described herein can avoid wasting targeted advertising by providing targeted advertisements to users based on predictions about intended recipients of previously purchased products and presently browsed products. These predictions can be derived based on information gathered from a purchase transaction, search history data, social information, and other sources.

Figure 1:
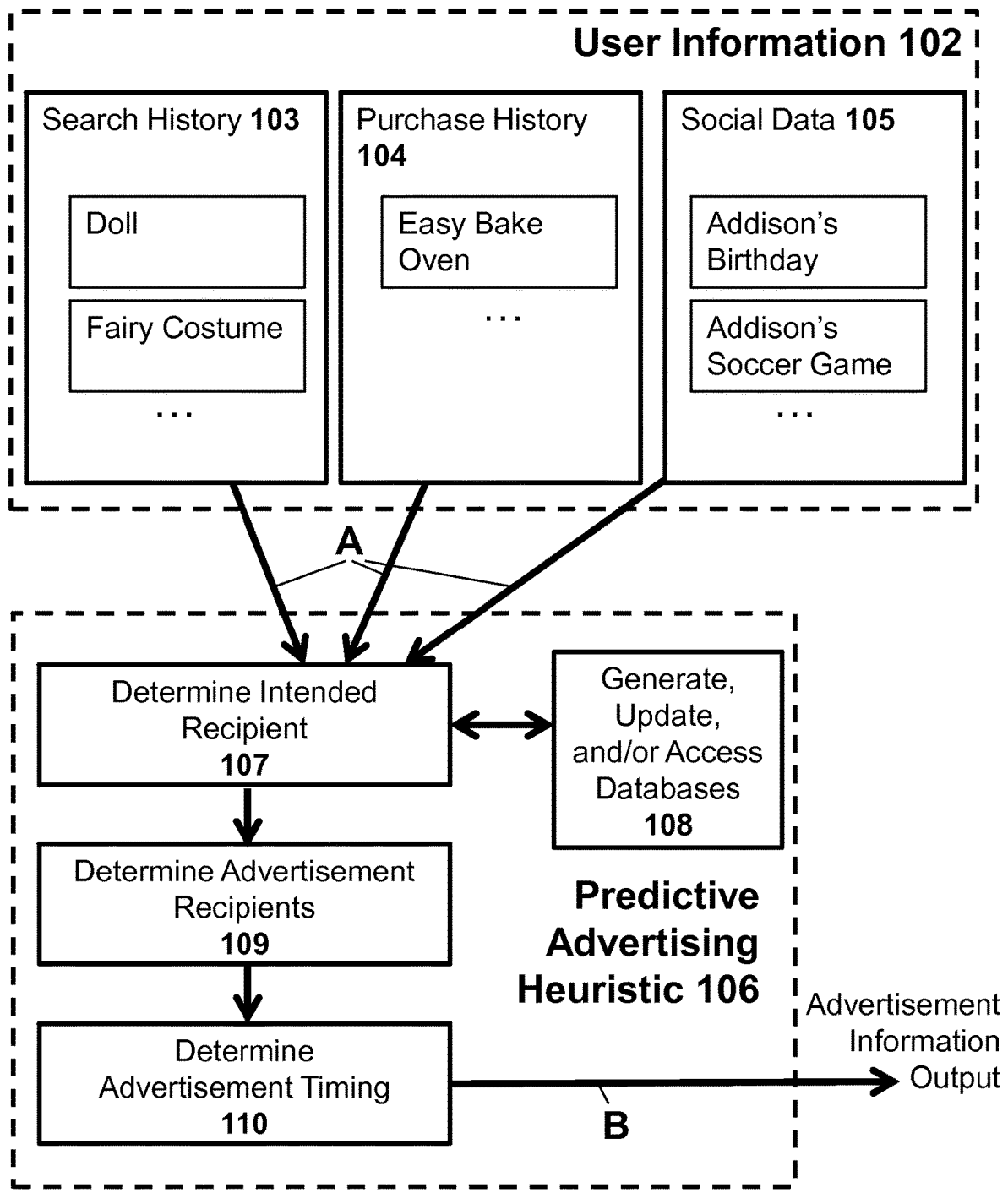
FIG. 1 illustrates an advertising system performing a targeted advertising operation in accordance with an embodiment.

Embodiments will now be described with reference to FIG. 1 by utilizing a representative example of an advertising system 100. In general, the advertising system 100 through exploitation of social networks identifies an intended recipient of a gift that was purchased or of items that are being browsed (e.g., a gift). Determining who a gift or item is for, or rather, a determined intended recipient can then be utilized to render improved targeted advertisements served to a buyer (e.g., or a purchaser/user/browser/potential buyer/etc.). For example, an advertiser may utilize an advertisement schedule to send advertisements to a market; however, by utilizing a rubric that relies on the intended recipient, the advertising system may store timing information for future use. For example, targeted advertisement for "gifts for a nephew of 4 years old" should be stopped shortly after that nephew's birthday party. Similarly, targeted advertisement for "gifts for a visiting friend" should be stopped after the friend has concluded their visit. Further, when the advertising system 100 identifies by leveraging social networks that a gift was for a niece on her birthday, the advertising system may at 11 to 12 months from the purchase of the gift show advertisements regarding birthday gifts for that niece to the uncle who purchased the gift. In turn, the time between the birthday and the 11 month mark may be filled with other targeted advertisements by the advertising system 100. In addition, by leveraging social networks, the advertising system 100 may discover preferences of the niece and enhance the subsequent round of targeted advertisements with the preferences. For instance, when the advertising system 100 detects that a social network page of the niece—lists that she is a pacifist, then advertisements by the advertising system 100 regarding plastic army weapons will be filtered out of targeted advertisements to the uncle and others related to the uncle (e.g., aunt/wife, mom/grandmother, son/cousin, etc.), as indicated by the social networks.

Further, the advertising system 100 can improve targeted advertising by monitoring a user's behavior. In one example, the advertising system 100 gathers and accumulates information regarding which people in a user's social graph are recipients of gifts. Thus, when the advertising system 100 detects that a user bought a gift for a close relative for a holiday, the advertising system 100 can assume that each year at a similar time the user will buy another gift for the same close relative. Further, the advertising system 100 gathers and accumulates information regarding all of the people that a user buys for during a year, and then as the Christmas or other holiday season arrives, the advertising system 100 renders targeted advertisements to the user regarding each of those people.

The advertising system 100 can also improve the advertising to a gift target based on the gift target themselves, product/services that a user related to the gift target is browsing, and/or a purpose of the gift (e.g., gift purpose or target criteria). For example, if a user is browsing for a birthday gift, once the advertising system 100 identifies an intended recipient, then that intended recipient may be provided targeted advertisement related to birthday party catering. Further, once a product is purchased by the user, the advertising system 100 may generate follow-on targeted advertisements for the intended recipient (e.g., if the user purchases a smart phone, then the intended recipient may receive follow-on targeted advertisements related to screen protectors, protecting cases, etc., while the intended recipient may not even realize that the smart phone has been purchased for them).

Additionally, the advertising system 100 can employ a refined graph search procedure to generate search suggestions and other passive confirmation techniques to interactively narrow down or filter a set of candidate recipients, and further narrow down the set of candidate recipients based on upcoming events for each of the candidate recipients that may indicate that they are likely to receive gifts (e.g., birthday, wedding, etc.). The advertising system 100 can refine a content and duration of the advertising displayed to the purchaser or potential purchaser based on the person and the event that the item is being purchased for and utilizes the actions of the purchaser to influence the content, timing, and duration of the advertisements displayed to the purchaser, user connected to the purchaser, and intended recipient. Refinement of searches, content, duration, etc. may include utilizing product information to derive probability estimations for target criteria, intended recipients, product/service suggestions, advertisement recipients, advertisement timing, and the like, as further described below.

Returning to FIG. 1, the advertising system 100 includes user information 102, which includes data conveyed either as a content of a message or through direct or indirect observation of some activity from which knowledge of a particular person can be derived. Examples of the user information 102 include search history 103, purchase history 104, and social data 105. Search history 103 comprises a list of web pages and associated data, such as page title, time of visit, etc. Purchase history 104 comprises a list of products/services and associated data, such as product/services title, value of purchase, time of purchase, etc. Social data 105 comprises information relating to and describing users and interactions between users, such as gender, age, career, interests, calendar events, relationship status, relationship information, etc. As illustrated in FIG. 1, examples of the user information 102 include a doll and a fairy costume as the search history 103, an Easy-Bake Oven as the purchase history 104, and indications that Addison's Birthday is pending and that Addison had a youth soccer game as social data 105.

The advertising system 100 can also include product information (not shown) that describes aspects of each product or service, such as a product/service name, manufacturer, provider, origination, warrantee, target demographic, age group, price, lifespan, durability, components, reviews, etc. Further, product information may include a provider's description that indicates an item's (e.g., product/service) target audience, based on the item's design/age/requirements/gender/etc. For example, a manufacturer's description may indicate that an 'Easy-Bake Oven' should be marketed and sold to young females.

The advertising system 100 also includes a predictive advertising heuristic 106 that implements the above features of the intended recipient identification, the targeted advertising based on behavior monitoring, the targeted advertisement to a gift target, the refined graph search procedure, and/or the refined advertising displayed to the purchaser or potential purchaser. In one operational example, the predictive advertising heuristic 106 receives (e.g., Arrows A) user information 102 that is utilized to output (e.g., Arrows B) advertisement information, which supports the generation of targeted advertisements by the advertising system 100. For instance, in response to and in accordance with a search for a product/services by a purchaser or potential purchaser, the predictive advertising heuristic 106 acquires (e.g., Arrow A) the search history 103, the purchase history 104, and the social data 105 as the user information 102. Note that user information 102 may be continuously received/acquired in real-time so that the predictive advertising heuristic 106 may utilize the most recent user information 102 in generating advertisement information or in batches so as to preserve network and processing resources.

Next, in block 107, the predictive advertising heuristic 106 proceeds to process the user information 102 to determine an intended recipient. That is, when an item (e.g., product/service) is purchased or browsed by a user, the predictive advertising heuristic 106 determines an intended recipient of this item (e.g., who is a gift target, is this a gift to my nephew, is this a gift to myself, etc.) by analyzing search history 103, purchase history 104, and/or the social data 105. Further, when multiple gift targets are identified, a probability will be calculated for each target. For example, the predictive advertising heuristic may confirm with the user when there are multiple gift targets. This confirmation may be done explicitly or passively. Explicit confirmation may include asking the user to provide input that identifies the gift target. Passive confirmation may include refining or augmenting a search engine by providing search suggestions, such as "other people specifically search for 4 years old boy" and/or "other people specifically search for 6 years old girl."

Figure 2:
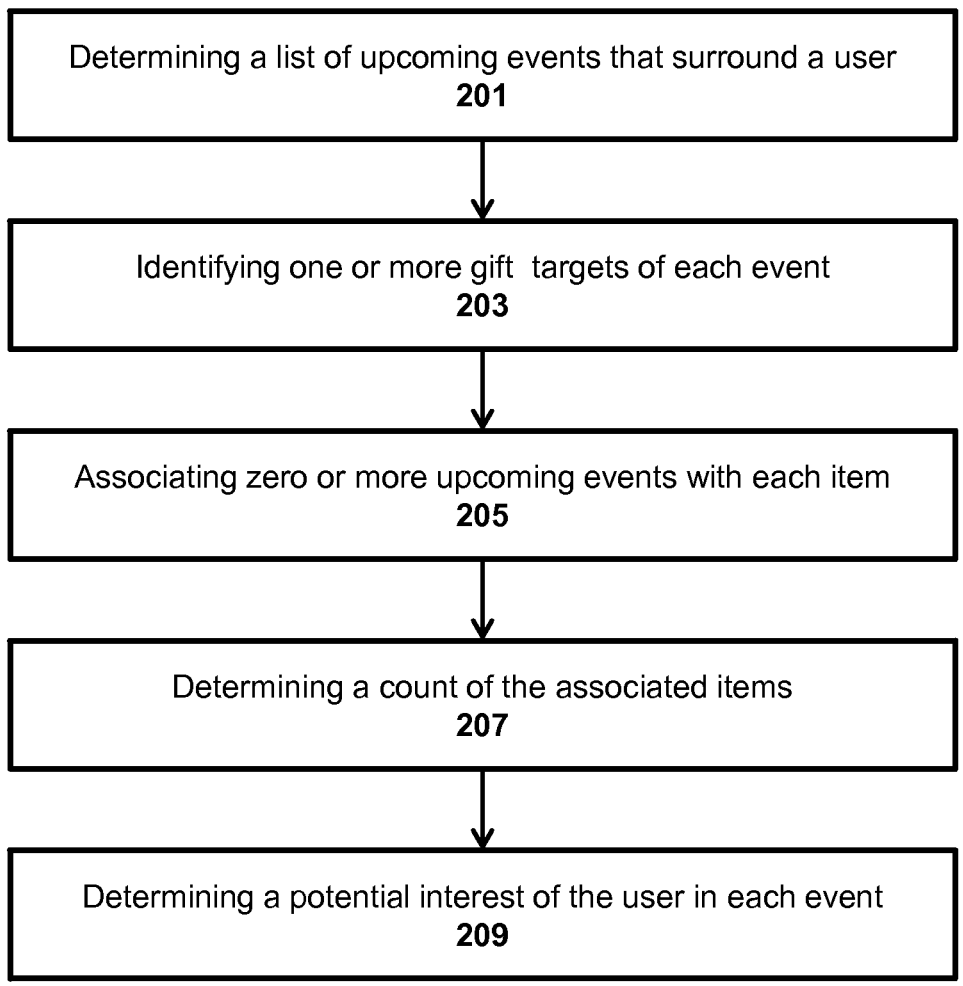
FIGS. 2-4 illustrate process flows of an advertising system in accordance with an embodiment in accordance with an embodiment.

FIG. 2 illustrates one example of a process flow 200 of determining an intended recipient. In block 201, the predictive advertising heuristic 106 determines a list of upcoming events that surround a user. Then in block 203, for each event, the predictive advertising heuristic 106 identifies one or more gift targets (e.g., a human, a pet, or an exhibition) of each event, which may be computed from the social data 105. In block 205, the predictive advertising heuristic 106 associates zero or more upcoming events with each item (e.g., collected from a search query or the browsed products/services indicated in the search history 103). For each upcoming event, in block 207, the predictive advertising heuristic 106 determines a count of the associated items within a time period (e.g. 1 hours, 1 day, 1 week, 2 weeks, etc.). Then, in block 209, the predictive advertising heuristic 106 determines a potential interest of the user in each event in accordance with the count. The interest of the user in joining a specific event, and the interest in bringing a gift to the event could further supplemented by other social network data, or confirmation from electronic invitation service (e.g. evite.com).

In another example of determining the intended recipient, the predictive advertising heuristic 106 may analyze the user information 102 to identify target criteria of the product/service search and associate the intended recipient with the target criteria. For example, the predictive advertising heuristic 106 identifies that the purchaser who searches for the doll and the fairy costume along with previously purchasing an Easy-Bake Oven may be searching for a gift for a young girl and determines the young girl (e.g., or female child between age 5 and 10) to be the target criteria. Further, the predictive advertising heuristic 106 analyzes the target criteria in view of the indication by the social data 105 of Addison's pending birthday to determine that the intended recipient is likely Addison.

In conjunction with determining the intended recipient, the predictive advertising heuristic 106 generates, updates, and/or accesses databases (e.g., block 108 of FIG. 1) to produce product/service suggestions. That is, because the user information 102 may be continuously received/acquired in real-time or in batches, the predictive advertising heuristic 106 may stores the received/acquired user information 102, along with product information of products/services. In turn, the user information 102 and the product information of the databases so that may be utilized as needed for product/service suggestions, as further described below with respect to FIG. 3.

Figure 3:
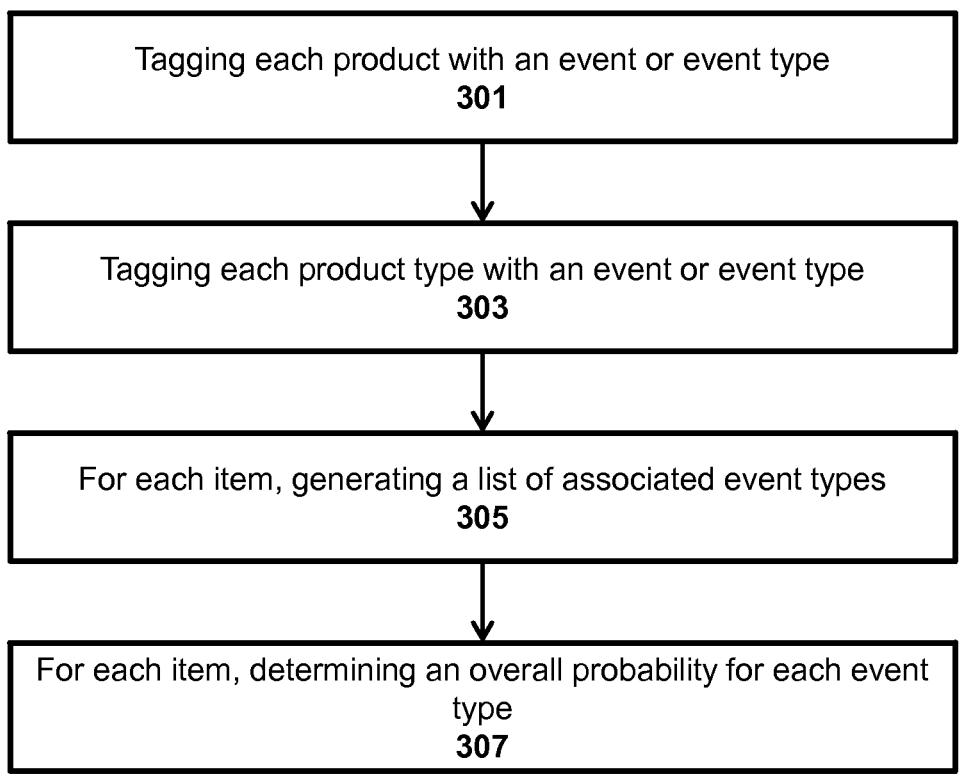

FIG. 3 illustrates one example of a process flow 300 of generating a database of items (e.g., products/services), and associated market/audience through crowd sourcing. In block 301, for each item browsed by a user, the predictive advertising heuristic 106 tags that item with an event or event type together with a determined probability. Then, in block 303, for each item browsed by the user, the predictive advertising heuristic 106 tags each item type with the event or the event type together with the determined probability. Next, in block 305 and 307, when multiple inputs are collected from multiple users, the predictive advertising heuristic 106 generates for each item a list of associated event types and determines an overall probability for each event type.

In another example of generating databases, the predictive advertising heuristic 106 may automatically identify and store in the databases that the purchaser searched for the doll and the fairy costume along with previously purchasing an Easy-Bake Oven based in the search and purchase histories 103, 104. Further, the predictive advertising heuristic 106 may, based on the social data 105, automatically identify and store in the databases that the intended recipient is Addison, that the purchaser is an uncle to Addison, that the uncle recently checked into Addison's soccer game, and that an interest of Addison includes the color green. Next, when the databases are accessed by the predictive advertising heuristic 106 to assist in determining product suggestions for a birthday gift for Addison, the predictive advertising heuristic 106 may identify as product suggestions for future targeted advertisements a popular princess doll, based on the uncle's previous searches, and/or a green soccer ball, based on Addison's interest.

The predictive advertising heuristic 106 further utilizes (e.g., blocks 109 and 110 of FIG. 1) the intended recipient and the product suggestions to determine a plurality of advertisement recipients and the timing of each advertisement to those recipients, each of which is packaged as advertisement information that is utilized to generate targeted advertisements by the advertising system 100. For instance, based on the social data 105, the predictive advertising heuristic 106 identifies as advertisement recipients a wife of the uncle, who is likely also an aunt to Addison, and a mother of the uncle, who is likely also a grandmother of Addison. Note that advertisement recipients may also be referred to as each potential purchasers. Next, the predictive advertising heuristic 106 determines as advertisement timing that the uncle, the aunt, and the grandmother should immediately receive advertisements for the popular princess doll and the soccer ball. Then, the predictive advertising heuristic 106 outputs (e.g., Arrow B) advertisement information that includes the intended recipient, the product suggestions, the advertisement recipients, and the advertisement timing, each of which is utilized by the advertising system 100 and/or external system to generate targeted advertisements.

In addition, if at any time the most recent user information 102 indicates a change in the conduct of the intended recipient and/or indicates alternative product suggestions, recipients, and/or timing, then the predictive advertising heuristic 106 may update the advertisement information accordingly. For example, if the most recent user information 102 indicates that the uncle has purchased the green soccer ball and that the grandmother and the aunt have purchased gifts other than those mentioned above for Addison for her upcoming birthday (e.g., such as in an email or social network message), then the predictive advertising heuristic 106 may send targeted advertisements with respect to the popular princess doll to each potential purchaser at a different advertisement timing, such as during an upcoming holiday season.

Figure 4:
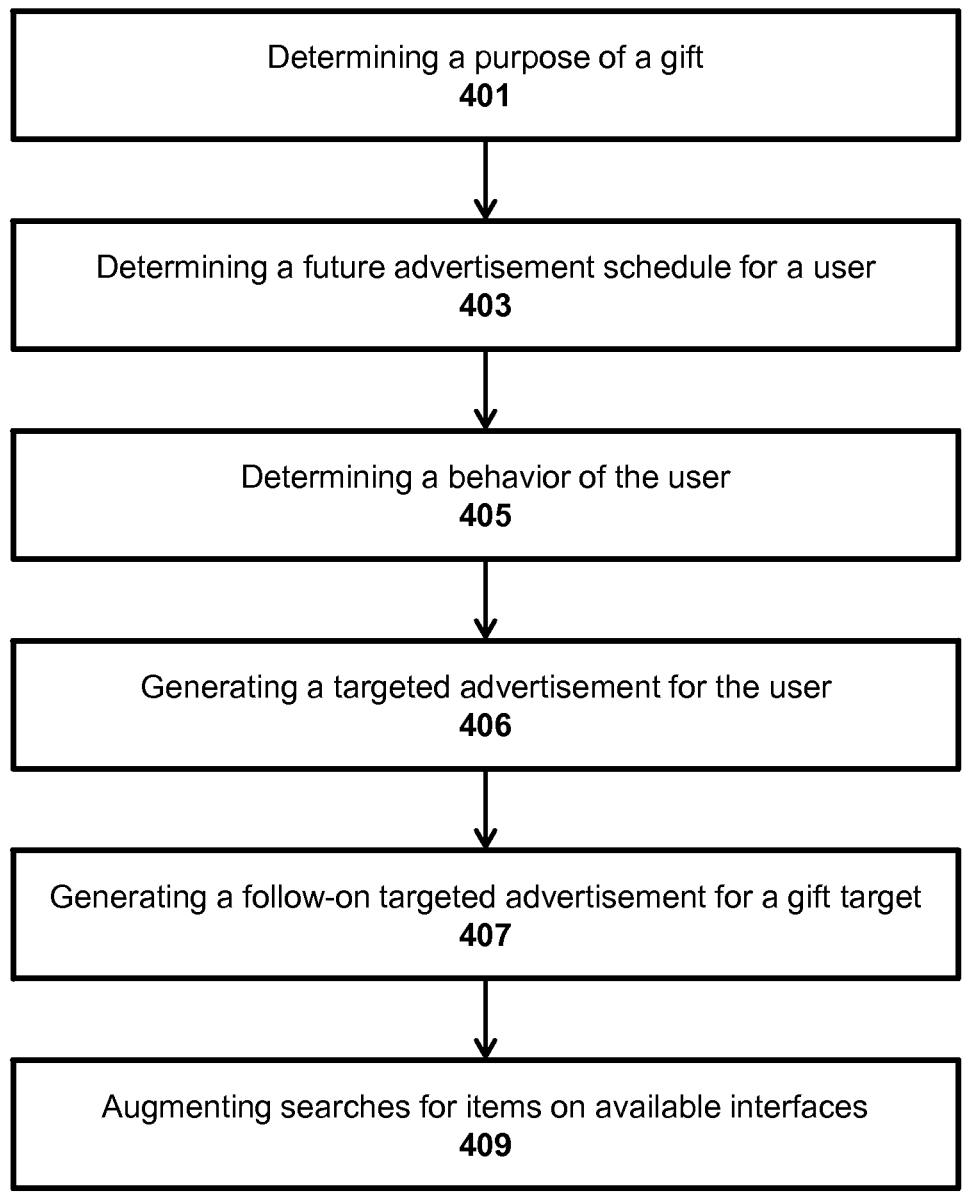

In another example, the predictive advertising heuristic 106 is configured to use a gift target's social network information, enhance an experience of potential purchasers and gift targets through search engine augmentation, and create highly targeted advertisement. FIG. 4 illustrates one example of a process flow 400 where, in block 401, based on at least one gift target, the predictive advertising heuristic 106 determines a purpose of a gift (e.g., target criteria). In block 403, based on at least the gift target and/or the target criteria, the predictive advertising heuristic 106 determines a future advertisement schedule for a user. In block 405, based on at least the gift target and/or the target criteria, the predictive advertising heuristic 106 determines a behavior of the user. In block 406, based on at least an item (e.g., products/services) that the user is browsing, the gift target, and/or the target criteria, the predictive advertising heuristic 106 generates at least one targeted advertisement for at least one potential purchaser. In block 407, based on at least the product purchased by the user and the gift target, the predictive advertising heuristic 106 generates at least one follow-on advertisement for the gift target. In block 409, based on at least one gift target, the predictive advertising heuristic 106 augments searches for items on all available interfaces, such as search queries on a general search engine and searches on product website, to provide better search result.

The advertising system 100 and elements therein may take many different forms and include multiple and/or alternate components and facilities. For instance, the advertising system 100 may include and/or employ any number and combination of computing devices and networks utilizing various communication technologies, as described above, that enable the advertising system 100 to query and retrieve information in support of generating targeted advertisements. While the advertising system 100 is shown in FIG. 1, the components illustrated in FIG. 1 are not intended to be limiting. Indeed, additional or alternative components and/or implementations may be used. In one example, the advertising system 100 may generally be included within a computing device employing a computer operating system, such as one of those mentioned above, as shown in FIG. 5.

Figure 5:
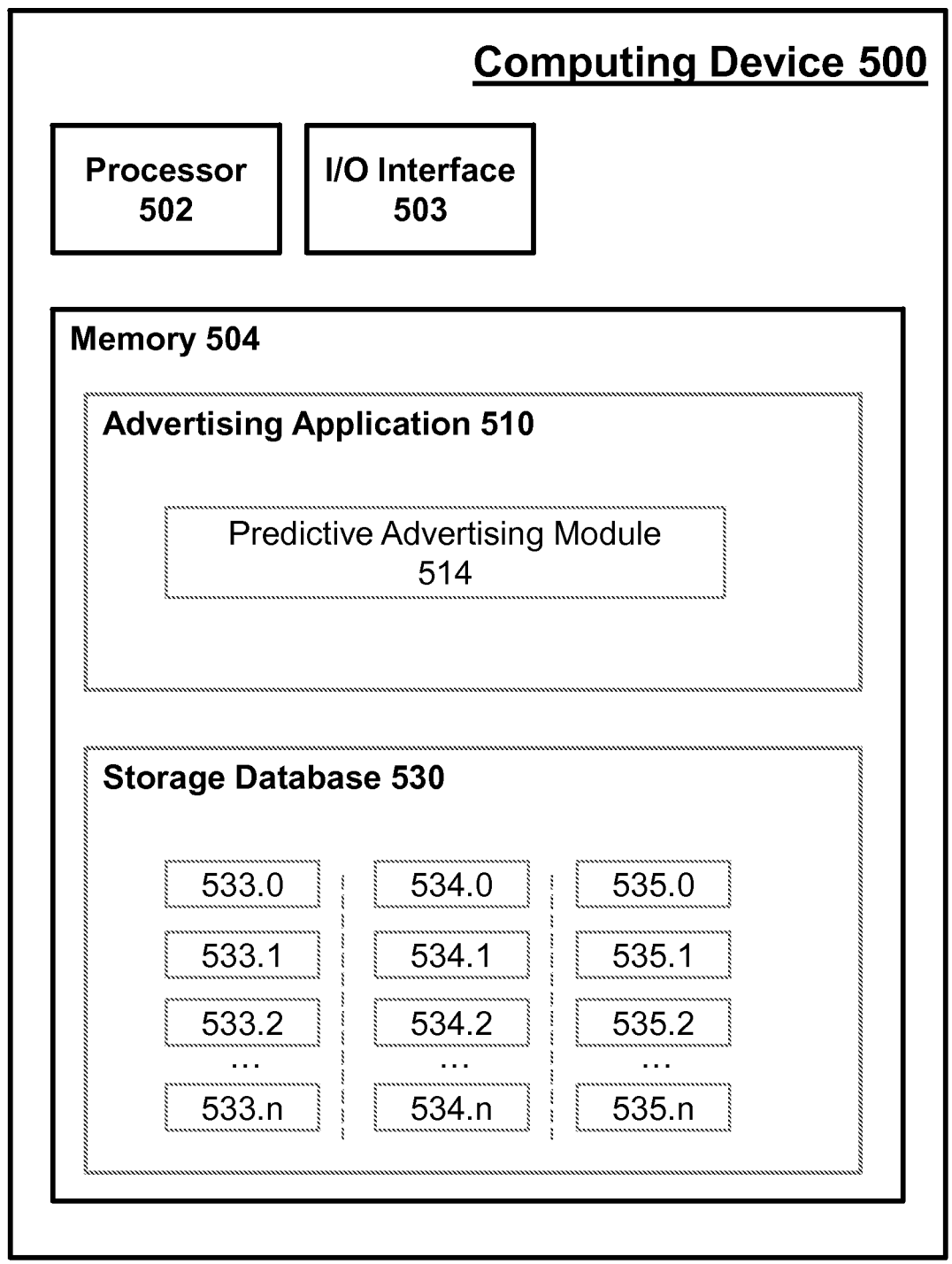
FIG. 5 illustrates a computing device schematic configured to perform targeted advertising operations in accordance with an embodiment.

FIG. 5 illustrates a computing device 500 (e.g., a computing device as described below) configured to provide a targeted advertising process that includes a processor 502, an input/output interface 503, and a memory 504. The processor 502 may receive computer readable program instructions from the memory 504 and execute these instructions, thereby performing one or more processes defined by an advertising application 510.

The processor 502 may include any processing hardware, software, or combination of hardware and software utilized by the computing device 500 that carries out the computer readable program instructions by performing arithmetical, logical, and/or input/output operations. Examples of the processor 502 include, but are not limited to an arithmetic logic unit, which performs arithmetic and logical operations; a control unit, which extracts, decodes, and executes instructions from a memory; and an array unit, which utilizes multiple parallel computing elements.

The input/output (I/O) interface 503 may include a physical and/or virtual mechanism utilized by the computing device 500 to communicate between elements internal and/or external to the computing device 500. That is, the I/O interface 503 may be configured to receive or send signals or data within or for the computing device 500. An example of the I/O interface 503 may include a network adapter card or network interface configured to receive computer readable program instructions from a network and forward the computer readable program instructions, original records, or the like for storage in a computer readable storage medium (e.g., memory 504) within the respective computing/processing device (e.g., computing device 500).

The memory 504 may include a tangible device that retains and stores computer readable program instructions, as provided by the advertising application 510, for use by the processor 502 of the computing device 500.

The advertising application 510 includes computer readable program instructions configured to provide accurate determinations of an 'intended recipient' of a purchased product or service' such that advertisers would have a better ability to target advertisements to a purchaser of a future product/service and a future recipient. That is, the advertising application 510 utilizes a predictive advertising module 514 to respond to a search for an item by a purchaser or potential purchaser by acquiring and analyzing from a storage database 530 user information 533, 534, 535 and product information (as further described below).

The predictive advertising module 514 includes computer readable program instructions configured to implement the above features of the intended recipient identification, the targeted advertising based on behavior monitoring, the targeted advertisement to a gift target, the refined graph search procedure, and/or the refined advertising displayed to the purchaser or potential purchaser.

While single items are illustrated for the application 510 (and other items) by FIG. 5, these representations are not intended to be limiting and thus, the application 510 items may represent a plurality of applications. For example, multiple advertising applications in different locations may be utilized to access the collected information (e.g., user information), and in turn those same applications may be used for on-demand data retrieval and targeted advertisement generation. In addition, although one modular breakdown of the application 510 is offered, it should be understood that the same operability may be provided using fewer, greater, or differently named modules. Although it is not specifically illustrated in the figures, the applications 510 may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 530 may include a database, data repository or other data store and may include various kinds of mechanisms for storing, accessing, and retrieving various kinds of data, including a hierarchical database, a set of files in a file system, an application database in a proprietary format, a relational database management system (RD-BMS), etc. The storage database 530 may include a database, as described above, capable of storing user information 533, 534, 535 and product information (not shown). The storage database 530 is in communication with the application 510 of and/or applications external to the computing device 500, such that user information 533, 534, 535 embodied as data instances, data structures, and documents including data structures may be collected and archived in support of the processes described herein (e.g., advertising process). In operation, for example, the storage database 530 may collect and archive user information 533, 534, 535 received from any system or sub-system external to the storage database 530. As illustrated in FIG. 5, the storage database 530 includes a plurality of user information 533, 534, 535, illustrated as search history instances 533.0 to search history instances 533.$n$, purchase history instances 534.0 to purchase history instances 534.$n$, and social network information instances 535.0 to social network information instances 535.$n$ (e.g., calendar and user relationship information), where 'n' is an integer representing a number structures archived by the storage database 530. Although one numbering sequence for the records of the storage database 530 is offered, it should be understood that the same operability may be provided using fewer, greater, or differently implemented sequences. The storage database 530 may be a part of the advertising application 510, run independently within the same device or system as the advertising application 510 (as illustrated in FIG. 5), or be an external to and in communication with, via a network in any one or more of a variety of manners, the advertising application 510. The storage database 530 may further communicate with other systems that may be internal or external to computing device 500 to collect and archive the user information 533, 534, 535.

Figure 6:
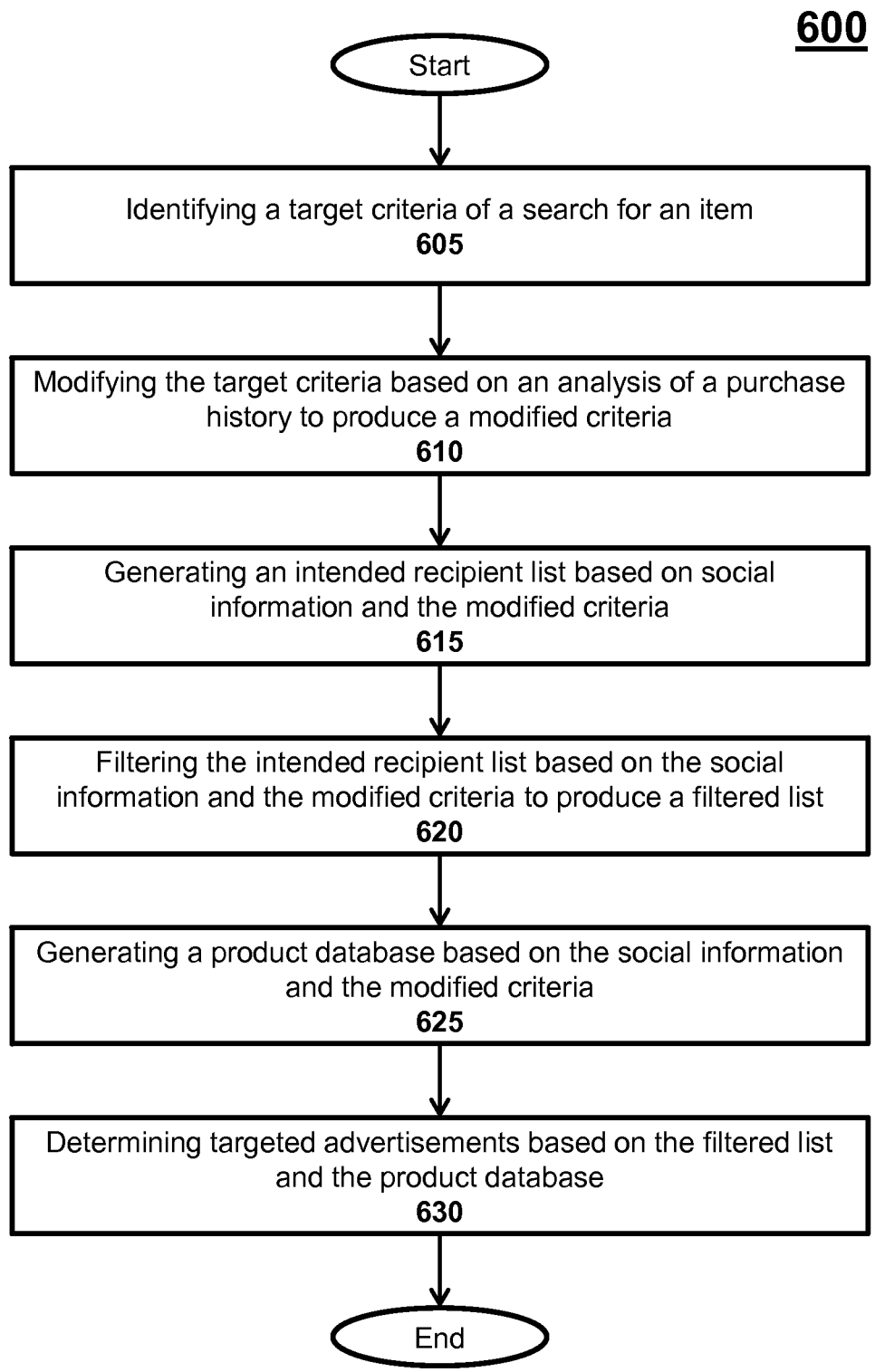
FIG. 6 illustrates a process flow of an advertising system in accordance with an embodiment.

The advertising system, method, and/or computer program as embodied in the computing device 500 will be described with reference to FIGS. 6-10. FIG. 6 illustrates a process flow 600 of the advertising application 510. The process 600 illustrates a set of operation blocks that are not limiting an order or grouping of operation blocks. In fact, the operation blocks may be executed in sequence, concurrently, or the operation blocks may sometimes be executed in the reverse order, depending upon the operability involved.

The process 600 begins, at block 605, when the application 510 identifies target criteria (e.g., gift purpose) of a product/service search by a potential purchaser, which may include a singular search for a singular product/service or a combination of searches for multiple products/services and/or variations on those products/services. The product/service search may be provided to the application 510 in real-time and/or acquired by the application 510 from the user information 533, 534, 535 of the database 530. For instance, the application 510 receives the search history instances 533.0-533.$n$ associated with a user (e.g., the purchaser or the potential purchaser) of the computing device 500, identifies target criteria for the items of the each search instance 533.0-533.$n$, and computes a probability that the identified target criteria correctly matches the items.

Figure 7:
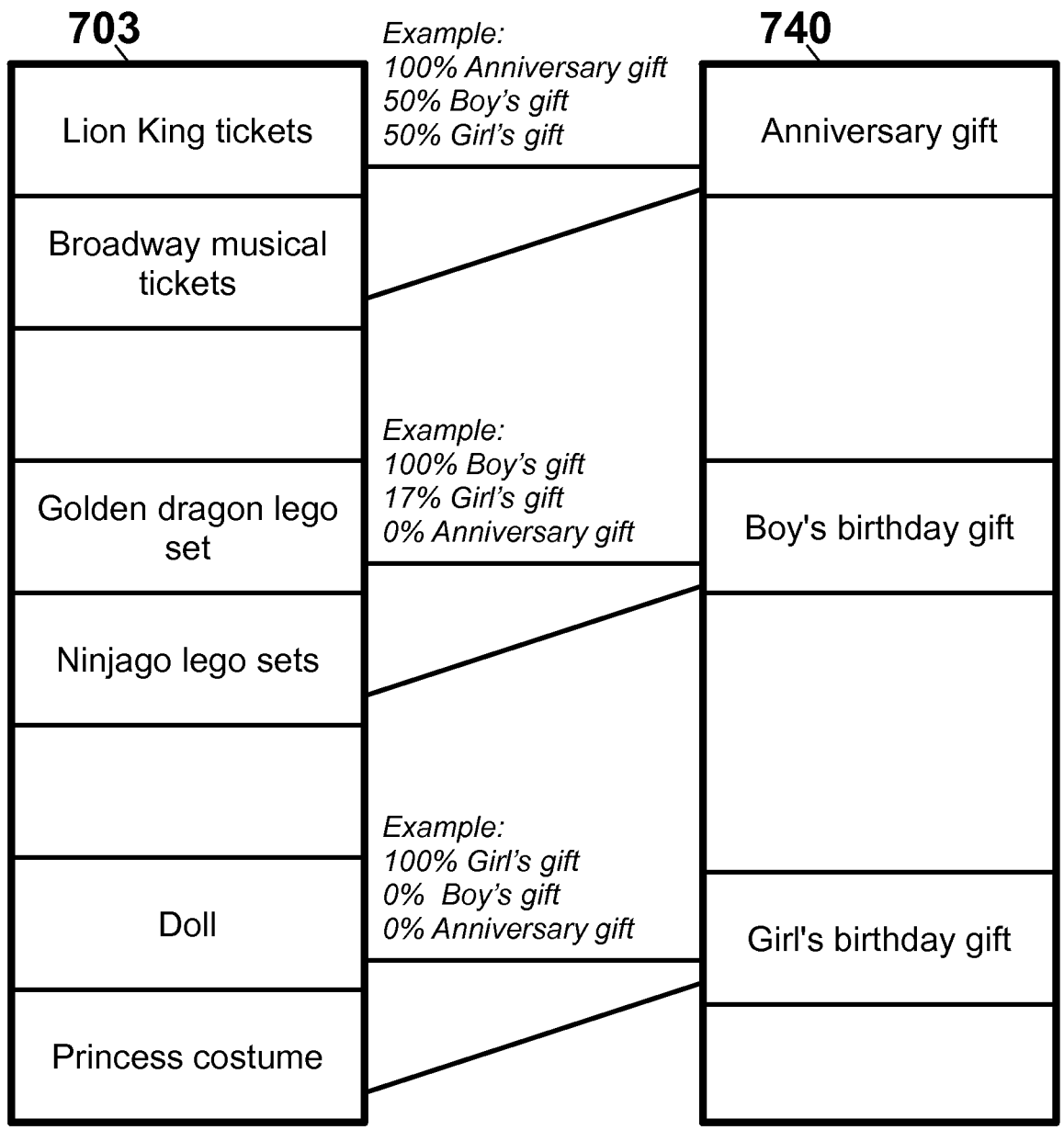
FIG. 7-10 illustrate matching and/or association examples of an advertising system in accordance with an embodiment.

FIG. 7 illustrates an example of matching items of a search history 703 and instances of target criteria 740, along with computed probability associations for each match. The items of the search history 703 include 'Lion King tickets,' 'Broadway musical tickets,' 'Golden dragon lego set,' 'Ninjago lego sets,' 'Doll,' and 'Princess costume.' The instances of the target criteria 740 include an 'Anniversary gift,' 'Boy's birthday gift,' and a 'Girl's birthday gift.' As illustrated, the application 510 computes which item is in relation to which criteria instance. In this case, based on product information and/or user information 533, 534, 535, the 'Lion King tickets' and 'Broadway musical tickets' are matched with the 'Anniversary gift;' the 'Golden dragon lego set' and 'Ninjago lego sets' are matched with the 'Boy's birthday gift;' and the 'Doll,' and 'Princess costume' are matched with the 'Girl's birthday gift.'

For instance, because the product information defines the 'Lion King tickets' and 'Broadway musical tickets' as fun for the whole family, both products are estimated to have a 100% probability of being an 'Anniversary gift,' while having an estimated a 50% probability of being a 'Boy's birthday gift' or a 'Girl's birthday gift.' Because the product information defines the 'Golden dragon lego set' and the 'Ninjago lego sets' as targeted to male children between the ages of 5 and 10, these products are estimated to have a 100% probability of being a 'Boy's birthday gift' and a 17% probability of being a 'Girl's birthday gift.' Also, because the product information defines the 'Doll' and 'Princess costume' as targeted to only female children between the ages of 5 and 10, these products are estimated to have a 100% probability of being a 'Girl's birthday gift' and a 0% probability of being a 'Boy's birthday gift.' Since the children's gifts are not defined by product information as targeted to adults, both products have a 0% probability of being an 'Anniversary gift.'

Figure 8:
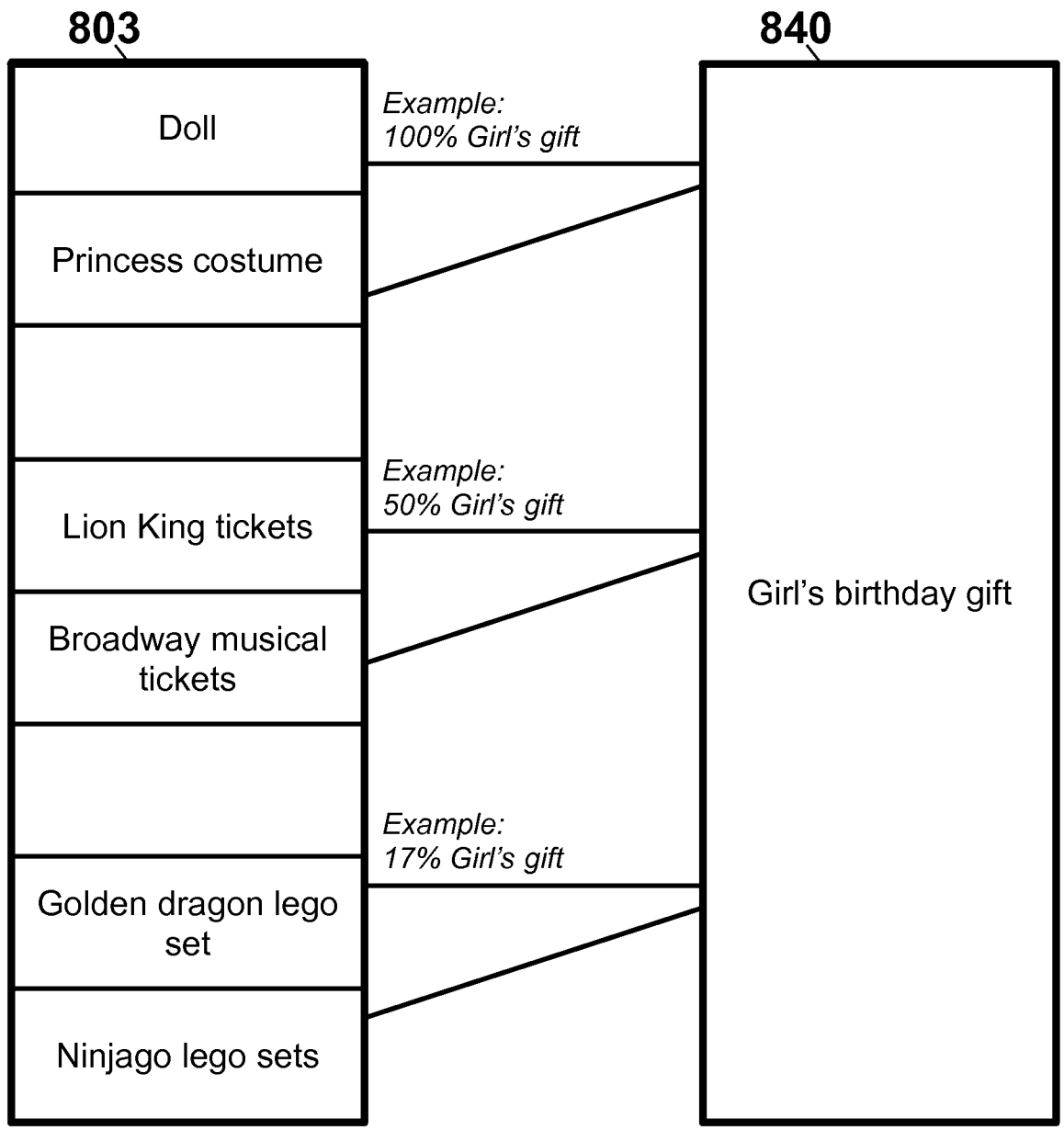

At block 610, the application 510 may modify the target criteria 740 based on an analysis of the user information 533, 534, 535, as seen in FIG. 8. FIG. 8 illustrates a search history 803, which is a re-ordered version of the search history 703 according to which product the potential purchaser is likely to purchase, matched to modified criteria 840. In the FIG. 8 scenario, the application 510 analyzed the target criteria 740 in view of purchase history instances 534.0-534.$n$ related to the purchaser to produce the modified criteria 840. For example, when a purchase history indicates that the purchaser has purchased 'Phantom Of The Opera tickets,' the application 510 computes that an 'Anniversary gift' has already been purchased. Further, the application 510 computes, based on calculated probabilities, that the purchaser was also conducting the product search for a 'Girl's birthday gift.' In turn, both the 'Anniversary gift' and 'Boy's birthday gift' are removed from the target criteria 740 to produce the modified criteria 840, which indicate at least one gift purpose.

Next, the process 600 proceeds to block 615 where the application 510 acquires or generates an intended recipient list based on social information 535 and the modified criteria 840. For example, by utilizing the social information instances 535.0-535.$n$, the application 510 identifies that the purchaser is connected via family relationships to multiple female children, such as a niece Addison, a daughter Bertha, and a cousin Courtney. Since these three children fit the modified criteria 840, they are included in the intended recipient list.

The application 510 may further utilize other information, such as search history instances 533.0-533.$n$ and purchase history instances 534.0-534.$n$, to acquire or generate an intended recipient list. For instance, in another example, the application 510 determines the intended recipient of an 'Easy_bake_oven.' In this example, the search history instances 533.0-533.$n$ contain 'Cabbage_patch,' 'Car_rental_in_Vegas,' 'China_patterns,' 'Cufflinks,' 'Hotels,' 'Luggage,' 'Nintends_DS,' 'Picture_Frames,' and 'Tricycle;' the purchase history instances 534.0-534.$n$ contain 'Easy_bake_oven;' and the social data, which is gathered from the purchaser's social network and/or social information instances 535.0-535.$n$, contains the following calendar events: 'Vacation_to_Vegas,' 'Wedding,' 'Birthday_party_for_niece.'

Figure 9:
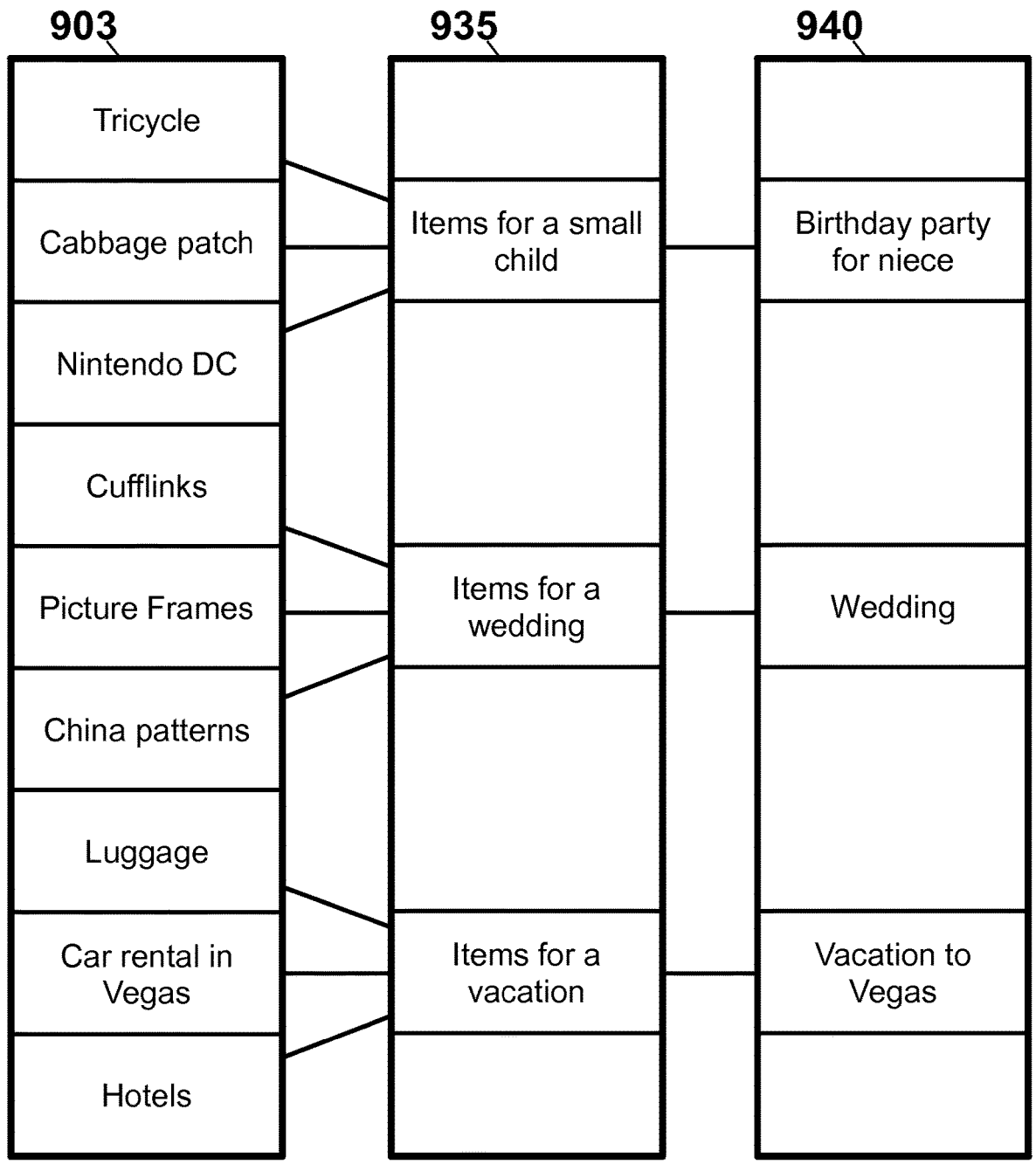

Further, in operation, the application 510 associates each search history instance 533.0-533.$n$ with a gift purpose, so that each search instance can be categorized according to a gift target of a user's browsing. Then, the application 510 associates the calendar events with each search instance via the categorization so that an intended recipient may be identified. For example, FIG. 9 illustrates a matching of instances of the search history 903 by the application 510 to categories of the target criteria list 935. Then, in FIG. 9, the instances of the target criteria list 935 are matched to each event of the calendar list 940, so that each event of the calendar list 940 is associated with at least one instance of the search history 903. Note that while one set of matching is depicted in FIG. 9, there may be some overlap between the matching (e.g., 'luggage' could be a wedding gift or something you need for a vacation, and therefore falls into both categories).

Figure 10:
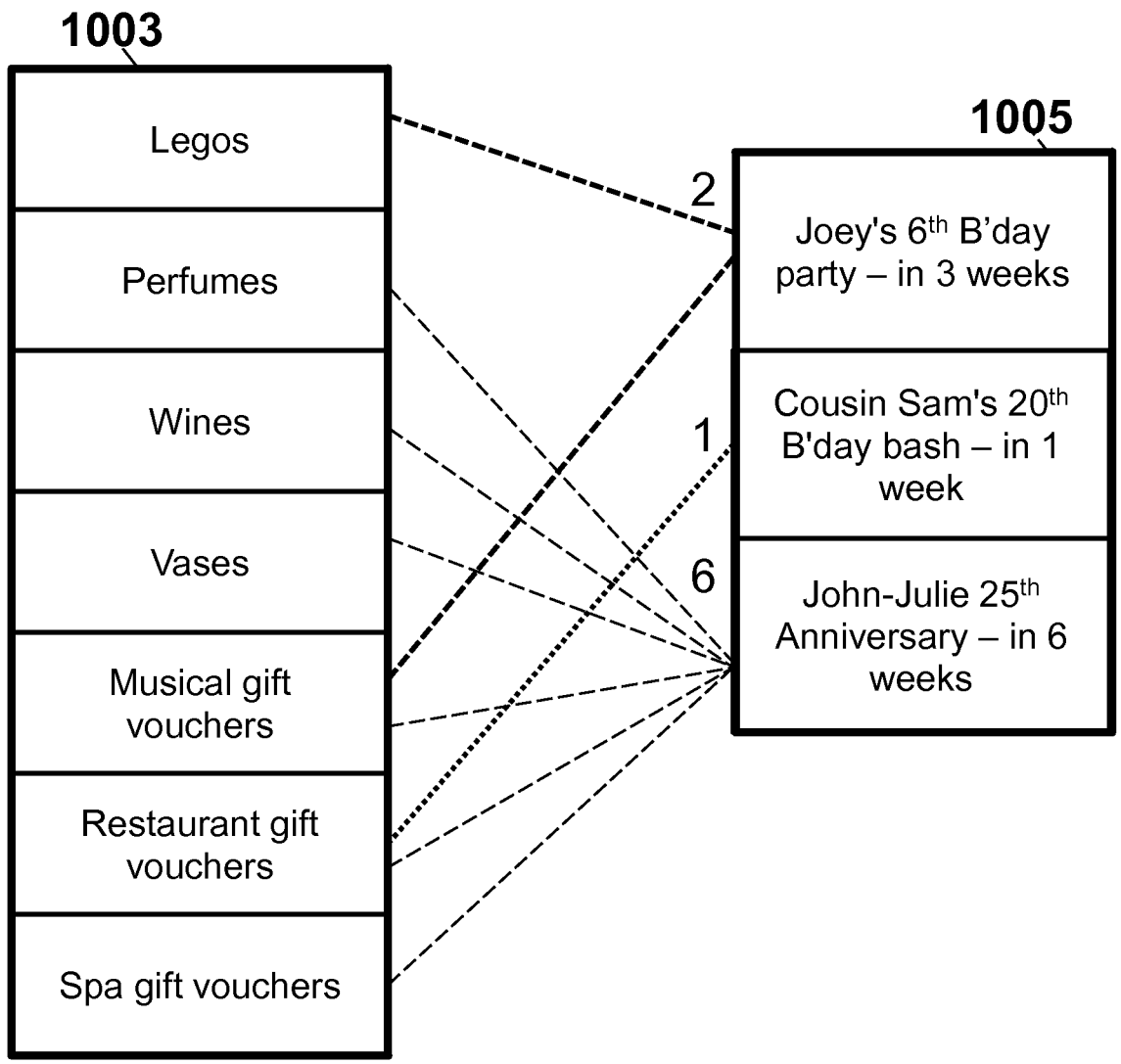

In another example of the application 510, FIG. 10 illustrates an association between a search history 1003 and social information 1005, where multiple products are associated with multiple social events (e.g., the items browsed by the user can be mapped to these events). In FIG. 10, a search history 1003 includes the products of 'Legos,' 'Perfumes,' 'Wine,' 'Vases,' 'Musical gift vouchers,' 'Restaurant gift vouchers,' and 'Spa gift vouchers.' The social information 10005 includes the social events of 'Joey's 6th B'day party—In 3 weeks,' 'Cousin Sam's 20th B'day bash—In 1 week,' and 'John-Julie 25$^{th}$ Anniversary—In 6 weeks,' each of which may be based on calendar information of the social information 1005. Note that in FIG. 10, the event with the most count (e.g., 6) would be the event for which the user is most interested in buying a gift and thus advertisement may be shown for this event. That is, the advertisements are based an event that the user is most interested in and, in FIG. 10, the John-Julie 25$^{th}$ Anniversary event have the most associated interest.

The determination of these categories or groups may also be obtained from the product information and/or by suggestions of a search engine utilized for browsing, such as toys for small children, wedding gift ideas, trip planning. Further, crowd sourcing may be utilized by the application 510 for the categorization of data. That is, when purchasing an item, a pop-up with a question requesting a purpose of the purchase may be used to gather data, such as 'Is this item for a vacation?' or 'Is this for a child?' Also, a drop down list soliciting a selection (e.g., from a list including man, woman, child, co-worker, friend, etc. and/or Graduation/Birthday/Wedding) may be utilized by the application 510 to collect data and refine categories. Thus, by using a conglomeration of many purchases, the application is able to understand the purpose of each purchase.

Next, the application 510 utilizes the categorization to discover the intended recipient of the purchase history item of 'Easy_bake_oven.' That is, because the 'Easy_bake_oven' is most likely to be in a small child category, the 'Easy_bake_oven' is associated with calendar event previously assigned to that category. In this example, the application 510 thus classifies the 'Easy_bake_oven' as a purchased item under the calendar event of 'Birthday party for niece.' Moreover, the application 510 then determines that person associated with the 'Birthday party for niece' is Addison; therefore, the intended recipient of the 'Easy_b- ake_oven' is likely to be Addison. Thus, the intended recipient list in this example includes at least one person.

Then, at block 620, the application filters the intended recipient list based on the social information instances 535.0-535.*n* and the modified criteria 840 to produce a filtered list. For example, because the social information instances further indicate that Addison has a pending birthday, while Bertha's and Courtney's respective birthdays have passed, Bertha and Courtney are filtered from the intended recipient list to produce a filtered list of at least one intended recipient (e.g., Addison).

Next, the process 600 proceeds to block 625 where the application 510 utilizes the user information 533, 534, 535 to generate a product database that is associated with each person of the filtered list. In the above case, because Addison is the only person on the filtered list, the product list will directly relate to Addison and her pending birthday. Thus, for example, when the social information instances 535.0-535.*n* indicate that Addison has interests in soccer and the color green and the products of the search history 533 include a number of products with a probability association above a certain threshold (e.g., above 51%), a product list including a 'green soccer ball,' a 'doll,' and a 'princess costume' is generated by the application 520.

At block 630, the application 510 determines and/or outputs advertisement information, in accordance with the filtered list and the product list, which enables the generation of targeted advertisements. Particularly, the application 510 utilizes the intended recipient to dynamically influence in real-time frequencies, durations, and contents of targeted advertisements displayed to the purchaser while the purchaser continues shopping. For instance, the application may determine through an analysis of the social information instances 535.0-535.*n* that the potential purchaser is an uncle to Addison. Further, the uncle and Addison are both determined to be connected to at least two other adults (e.g., a wife/aunt and mother/grandmother). In this way, the advertisement information is utilized by the application 510 to deliver targeted advertisements to each adult, while Addison's birthday is pending. Thus, the application may generate and provide a targeted advertisement for a soccer ball during subsequent internet browsing by the uncle, a targeted advertisement for a doll during subsequent internet browsing by the aunt, a targeted advertisement for a princess costume during subsequent internet browsing by the grandmother, and/or any combination thereof.

Then, the process 600 ends.

The advertising system, method, and/or computer program will now be described, with reference to the advertising system 100 of FIG. 1, in FIGS. 11-13.

Figure 11:
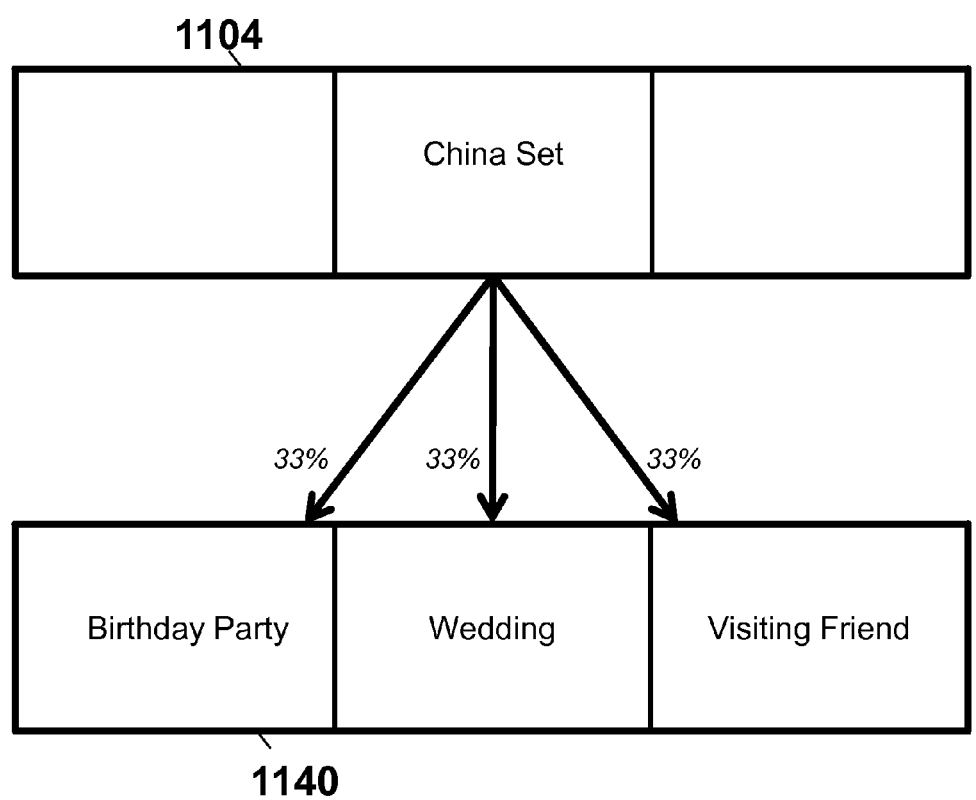
FIGS. 11-13 are block schematics of different probability phases during a targeted advertising operation of an advertising system in accordance with an embodiment.
Figure 12:
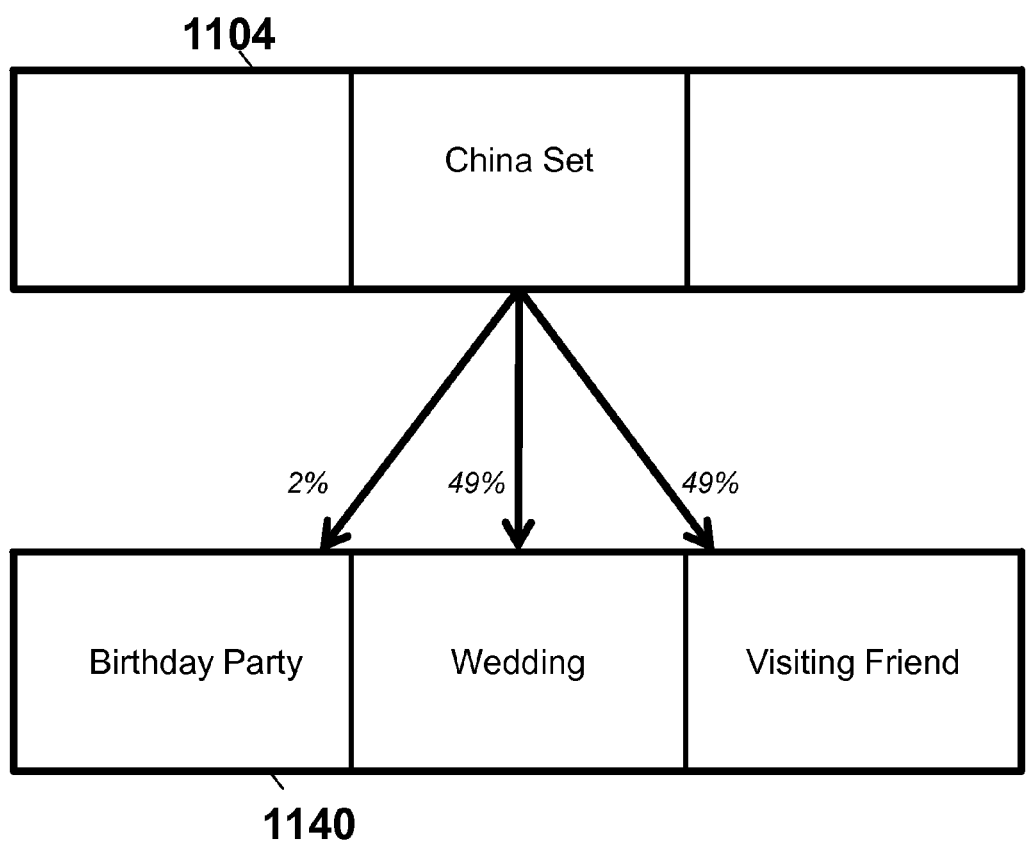
Figure 13:
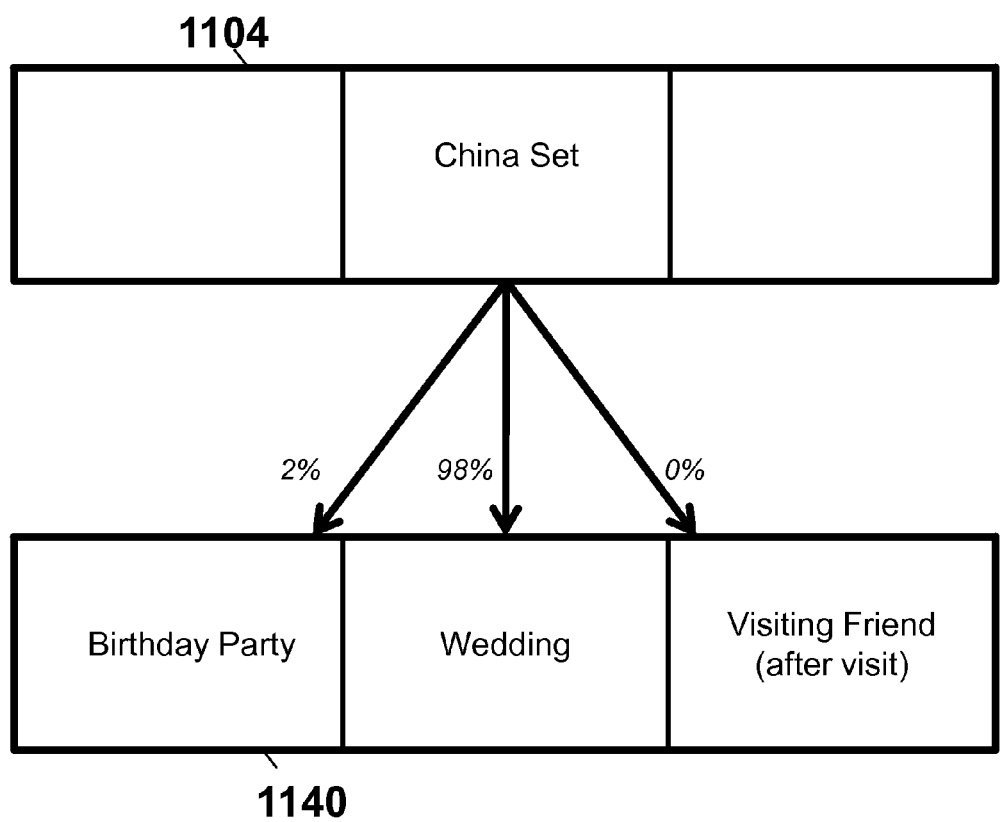

FIGS. 11-13 are block schematics of different probability phases during a targeted advertising operation of an advertising system. Particularly, FIGS. 11-13 describe a use case where, based on a gift target, the advertising system 100 determines target criteria and utilizes that target criteria to enhance targeted advertisement decisions, such as the advertisement duration. As indicated in FIG. 11, the advertising system 100 detects that an item (e.g., China Set of purchase history 1104) has been purchased. If the social data 1140 indicates that a variety of events (e.g., Birthday Party, Wedding, and Visiting Friend) are pending for the purchaser, the advertising system 100 then determines and/or associates an even probability (e.g., 33%) for each event when it has no further information. Then, in FIG. 12, when the advertising system 100 determines, by analyzing an additional purchase history of the purchaser, that an Easy-Bake Oven was also purchased, the advertising system 100 may then compute that the Easy-Bake Oven has a gift purpose of a birthday gift. The advertising system 100, therefore, reduces the probability that the China Set is also for the Birthday Party event (e.g., to a nominal 2%) while increasing the probability that the China Set is for the other events (e.g., 49% respectively). Next, in FIG. 13, when the advertising system 100 determines that a visit with a friend has passed, then then the advertising system 100 reduces the probability of the Visiting Friend event (e.g., 0%). In turn, the Wedding event is proportionally increased (e.g., 90%). Thus, the advertising system 100 has computed that the China Set has a very high probability of being for the Wedding event in relation to the other events.

In view of the above, the advertising system, method, and/or computer program product is a significant improvement over inappropriate or incorrectly targeted advertisements based on a user's interaction with information. Particularly, the advertising system, method, and/or computer program enables future pre-scheduled advertisement with an understanding of a gift target and a gift purpose (e.g., "what's the occasion"). In addition, the advertising system, method, and/or computer program utilizes a user's understanding of the gift target's preferences (e.g., through the data analytics) to influence the user's selection of gift. In other works, the advertising system, method, and/or computer program is looking at a more than a user's social network and assuming a gift purchase; the advertising system, method, and/or computer program combines the social data from social networks, purchase history, and browsing history to determine if they are likely to be purchasing a gift, and if so then we likely know who it is for.

Figure 14:
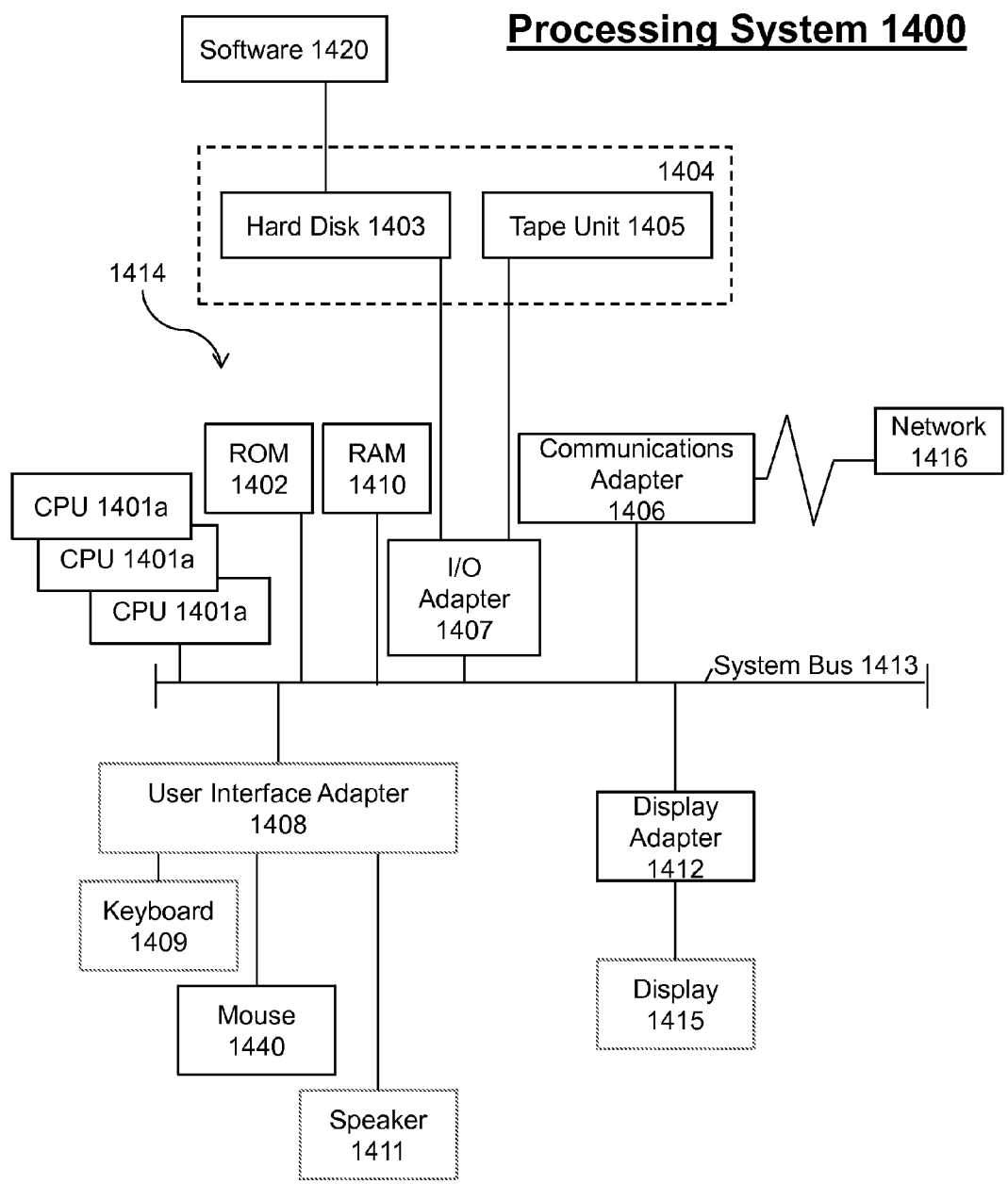
FIG. 14 illustrates a processing system schematic configured to perform targeted advertising operations in accordance with an embodiment.

Referring now to FIG. 14, there is shown another embodiment of a processing system 1400 for implementing the teachings herein. Systems and/or computing devices, such as advertising system (e.g., advertising system 100 of FIG. 1, computing device 500 of FIG. 2, and processing system 1400 of FIG. 14), may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

In this embodiment, the processing system 1400 has one or more central processing units (processors) 1401*a*, 1401*b*, 1401*c*, etc. (collectively or generically referred to as processor(s) 1401). Processors 1401, also referred to as processing circuits, are coupled to system memory 1414 and various other components via a system bus 1413. Read only memory (ROM) 1402 is coupled to system bus 1413 and may include a basic input/output system (BIOS), which controls certain basic functions of the processing system 1400. The system memory 1414 can include ROM 1402 and random access memory (RAM) 1410, which is read-write memory coupled to system bus 1413 for use by processors 1401.

FIG. 14 further depicts an input/output (I/O) adapter 1407 and a network adapter 1406 coupled to the system bus 1413.

I/O adapter 1407 may be a small computer system interface (SCSI) adapter that communicates with a hard disk 1403 and/or tape storage drive 1405 or any other similar component. I/O adapter 1407, hard disk 1403, and tape storage drive 1405 are collectively referred to herein as mass storage 1404. Software 1420 for execution on processing system 1400 may be stored in mass storage 1404. The mass storage 1404 is an example of a tangible storage medium readable by the processors 1401, where the software 1420 is stored as instructions for execution by the processors 1401 to perform a method, such as the process flows of FIGS. 2-4 and 6. Network adapter 1406 interconnects system bus 1413 with an outside network 1416 enabling processing system 1400 to communicate with other such systems. A screen (e.g., a display monitor) 1415 is connected to system bus 1413 by display adapter 1412, which may include a graphics controller to improve the performance of graphics intensive applications and a video controller. In one embodiment, adapters 1407, 1406, and 1412 may be connected to one or more I/O buses that are connected to system bus 1413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1413 via user interface adapter 1408 and display adapter 1412. A keyboard 1409, mouse 1440, and speaker 1411 can be interconnected to system bus 1413 via user interface adapter 1408, which may include, for example, a Super I/O chip integrating multiple device adapters into a single integrated circuit.

Thus, as configured in FIG. 14, processing system 1400 includes processing capability in the form of processors 1401, and, storage capability including system memory 1414 and mass storage 1404, input means such as keyboard 1409 and mouse 1440, and output capability including speaker 1411 and display 1415. In one embodiment, a portion of system memory 1414 and mass storage 1404 collectively store an operating system such as the AIX® operating system from IBM Corporation to coordinate the functions of the various components shown in FIG. 14.

In general, embodiments described herein provide determinations of an intended recipient of a purchased product or service such that advertisers can have a better ability to target advertisements to a purchaser of a future product/service. Embodiments can be used to determine the intended recipient while an online user (e.g., a purchaser) is shopping for that product/service. After the intended recipient has been identified, embodiments can utilize the intended recipient to dynamically influence, in real-time, frequencies, durations, and contents of targeted advertisements displayed to the purchaser while the purchaser continues shopping, along with those connected to the purchaser and the intended recipient. Thus, by determining who the intended recipient is, embodiments can be utilized to provide business value for advertisers seeking to increase the effectiveness of their targeted advertisements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having program instructions for leveraging one or more social networks to determine preferences and online activity of a user to improve advertising to at least one item embodied therewith, the program instructions executable by a processor of an advertising computer system to cause the processor to:

identify and select a target criteria of a search entry from a search history associated with the online activity of the user, the identifying and the selecting of the target criteria of the search entry leveraging the online activity within a social network page of the one or more social networks, the search history comprises one or more searches for products, services and variations on those products and services related to the at least one item, the target criteria comprising two or more gift purpose instances selected from a target criteria list;

analyze a purchase history related to the user to modify the target criteria, which produces a modified criteria utilized by the advertising computer system to improve advertising to the at least one item;

identify an intended recipient based on the modified criteria and based on social information of the one or more social networks by:

generating an intended recipient list based on the social information and the modified criteria, the intended recipient list identifying persons with relationships to the user, receiving a selection of an augmented search selection, filtering the intended recipient list based on the social information, one or more passive confirmations, and the modified criteria to produce a filtered list including the intended recipient, the one or more passive confirmations including at least the selection of an augmented search suggestion, and utilizing user information to generate a product database that is associated with each person of the filtered list;

associate the at least one item with the intended recipient by:

analyzing the social information and the target criteria, mapping multiple search products of the search history to multiple social events of the one or more social networks, and determining counts of the search products mapped to the multiple social events, where the counts indicate a user interest for a corresponding event, and determining an event from the multiple social events with a highest count that indicates a highest user interest in buying a gift;

output, for the event with the highest count, advertisement information comprising an item suggestion list, the intended recipient, advertisement timing information, the at least one item with the intended recipient, and at least one of a plurality of advertisement recipients, each of which is related to enable the generation of a targeted advertisement, and the at least one item being utilized in the targeted advertisement; and generate the targeted advertisement of the at least one item associated with the intended recipient.

2. The computer program product of claim 1, wherein, with respect to the identification of the intended recipient based on social information associated with the user and the target criteria, the program instructions are further executable by the processor to cause the processor to:

determine an associated one or more of entities, individuals, events, or situations from the search history.

3. The computer program product of claim 1, wherein the program instructions are further executable by the processor to cause the processor to:

receiving user information, the user information including the search history and the social information.

4. The computer program product of claim 1, wherein a predictive advertising heuristic generates the targeted advertisement of the at least one item associated with the intended recipient.

5. An advertising computer system comprising:

a memory having computer readable instructions for leveraging one or more social networks to determine preferences and online activity of a user to improve advertising to at least one item; and a processor for executing the computer readable instructions, the computer readable instructions configured to cause the advertising computer system to:

identify and select a target criteria of a search entry from a search history associated with the online activity of the user, the identifying and the selecting of the target criteria of the search entry leveraging the online activity within a social network page of the one or more social networks, the search history comprises one or more searches for product, services and variations on those products and services related to the at least one item, the target criteria comprising two or more gift purpose instances selected from a target criteria list;

analyze a purchase history related to the user to modify the target criteria, which produces a modified criteria utilized by the advertising computer system to improve advertising to the at least one item;

identify an intended recipient based on the modified criteria and based on social information of the one or more social networks by:

generating an intended recipient list based on the social information and the modified criteria, the intended recipient list identifying persons with relationships to the user, receiving a selection of an augmented search selection, filtering the intended recipient list based on the social information, one or more passive confirmations, and the modified criteria to produce a filtered list including the intended recipient, the one or more passive confirmations including at least the selection of an augmented search suggestion, and utilizing user information to generate a product database that is associated with each person of the filtered list;

associate the at least one item with the intended recipient by:

analyzing the social information and the target criteria, mapping multiple search products of the search history to multiple social events of the one or more social networks, and determining counts of the search products mapped to the multiple social events, where the counts indicate a user interest for a corresponding event, and determining an event from the multiple social events with a highest count that indicates a highest user interest in buying a gift;

output, for the event with the highest count, advertisement information comprising an item suggestion list, the intended recipient, advertisement timing information, the at least one item with the intended recipient, and at least one of a plurality of advertisement recipients, each of which is related to enable the generation of a targeted advertisement, and the at least one item being utilized in the targeted advertisement; and generate the targeted advertisement of the at least one item associated with the intended recipient.

6. The system of claim 5, wherein, with respect to the identification of the intended recipient based on social information associated with the user and the target criteria, the computer readable instructions further cause the system to:

determine an associated one or more of entities, individuals, events, or situations from the search history.

7. The system of claim 5, wherein the computer readable instructions further cause the system to:

receive user information, wherein the user information includes the search history and the social information.

* * * * *